3,496,117
HYDRODESULFURIZATION CATALYST PREPARATION

Kenneth D. Vesely, La Grange Park, and Harold D. Gass, Jr., Cicero, Ill., assignors to Universal Oil Products Company, Des Plaines, Ill., a corporation of Delaware
No Drawing. Filed Oct. 2, 1967, Ser. No. 671,969
Int. Cl. B01j 11/06, 11/08
U.S. Cl. 252—465                                                    10 Claims

ABSTRACT OF THE DISCLOSURE

A method of catalyst preparation. Molybdenum and/or other Group VI–B metal, and nickel and/or other iron group metal are impregnated on a carrier material from a common ammoniacal solution thereof. The impregnation is carried out in stages, each stage being followed by calcination at oxidation conditions. Catalyst containing an excess of about 3.5 weight percent nickel and/or other iron group metal, in an excess of 7.0% molybdenum and/or other iron group metal, in an excess of 7.0% molybdenum and/or other Group VI–B metal are prepared in improved yield.

Background of the invention

The catalytic reforming of various petroleum fractions including straight run gasoline, natural gasoline, catalytically cracked naphtha fractions, thermally cracked hydrocarbon distillates, and the like, has been shown to be a particularly advantageous method of improving the anti-knock characteristics, or octane rating, of said petroleum fractions. In particular, reforming processes which utilize platinum as a catalyst, usually on an alumina support, have been very successful. Such catalysts effect a number of hydrocarbon conversion reactions which, in combination, are highly pertinent to the reforming process. Thus, the platinum catalysts effect the hydrocracking and isomerization of paraffinic hydrocarbons, the hydrogenation of napthenes to aromatics and dehydrocyclization of paraffins to aromatics, all of which are conducive to improved octane rating, or anti-knock characteristics, of the petroleum fraction treated.

The selectivity and stability of the platinum-containing catalysts are strongly and adversely affected by olefinic organic compounds, and nitrogenous and sulfurous compounds generally present to some degree in the petroleum fraction treated in contact with the platinum catalyst. In the substantial absence of the named contaminants, the platinum-containing catalyst will function over extended periods of time at optimum selectivity and stability.

Elimination of the difficulties arising as a result of the presence of the various contaminants contained in the petroleum fraction to be treated has been achieved with a fair degree of success by pre-treating the petroleum fraction in contact with a catalyst particularly adapted to the conversion of sulfurous ad nitrogenous compounds to hydrogen sulfide and ammonia respectively, and to the conversion of olefinic compounds to saturated compounds. The catalysts so employed are most usually referred to as hydrodesulfurization catalysts and generally comprise one or more metal components from Group VIII of the Periodic Table in combination with one or more metal components from Group VI–B on an alumina support, said metal components being in the form of an oxide thereof.

In the manufacture of the hydrodesulfurization catalyst hereinabove referred to, it is frequently preferred to impregnate the alumina or other refractory inorganic oxide with a common solution of an iron group metal compound and a Group VI–B metal compound, suitable co-solubility being achieved in an ammoniacal media. For various reasons the iron group metal compound is a nitrate, preferably nickel and/or cobalt nitrate. The nitrates embody a number of advantages among which aretheir solubility in a minimum amount of impregnating solution, their ready conversion to oxides in the final catalyst composite, and the absence of components, such as halide, which have a deleterious affect on the catalyst.

In the preparation of hydrodesulfurization catalysts containing up to about 3.5 weight percent iron group metal in the form of its oxide in combination with up to about 7.0 weight percent of a Group VI–B metal in the form of its oxide, suitable yields of catalysts product are achieved. However, as is frequently the case, when it is attempted to embody in excess of about 3.5 weight percent nickel in combination with an excess of about 7.0 weight percent molybdenum, the yield of catalyst product falls off drastically.

It is an object of this invention to present an improvement in the method of treating a refractory inorganic oxide carrier material with an ammoniacal solution of a Group VI–B metal compound and an iron group metal nitrate whereby in excess of about 3.5 weight percent iron group metal and in excess of about 7.0 weight percent Group VI–B metal is composited therewith to form a hydrodesulfurization catalyst. It is a further and more specific object to manufacture said hydrodesulfurization catalyst in improved yields.

Summary of the invention

In one of its broad aspects, the present invention relates to a process for preparing a catalyst composite comprising in excess of about 3.5 weight percent iron group metal and in excess of about 7.0 weight percent Group VI–B metal composited with a refractory inorganic oxide carrier material whereby said carrier material is treated with an ammoniacal impregnating solution of a Group VI–B metal compound and an iron group metal nitrate, and embodies the improvement which comprises (a) compositing a Group VI–B and an iron group metal with said carrier material by treating the same with an ammoniacal solution of a Group VI–B metal compound and an iron group metal nitrate and calcining the resultant composite at oxidation conditions, the metals concentration of said ammoniacal solution being sufficiently limited so as to deposit less than about 3.5 weight percent iron group metal on said carrier material, and less than about 7.0 weight percent Group VI–B metal, (b) further treating the calcined composite at least once in accordance with the procedure of step (a), including calcination at oxidation conditions, and recovering a catalyst composite comprising an iron group metal in excess of about 3.5 weight percent thereof and a Group VI–B metal in excess of 7.0 weight percent thereof.

The refractory inorganic oxide carrier material employed in the manufacture of the hydrodesulfurization catalysts herein comtemplated is usually alumina or alumina composited with another refractory inorganic oxide such as silica, zirconia, thoria, magnesia, titania, zinc oxide and the like. Said hydrodesulfurization catalysts are generally prepared utilizing a pre-formed refractory inorganic oxide conforming to the desired size and shape of the catalyst product. Thus, the alumina, or other refractory inorganic oxide, is pre-formed into particles of definite size and shape, for example, by commingling a suitable pelleting agent with a powdered form of the carrier material and compressing the same into pellets of uniform size and shape. When a spheroidal catalyst product is desired, the refractory inorganic oxide is dropped in the form of sol into a water immiscible suspending medium whereby firm gel macrospheres are formed. Alternatively, the refractory inorganic oxide can be prepared as a slurry and sprayed in an atomized state into an atmosphere of hot inert gases with the rapid evaporation of moisture whereby dried microspheres in a predetermined sized range fall out of the spray. In any case, unless otherwise dried during preparation, the refractory inorganic oxide is dried and thereafter calcined to yield the desired pre-formed carrier material.

By the process of this invention, the pre-formed refractory inorganic oxide carrier material is treated with an ammoniacal impregnating solution of a Group VI–B metal compound and an iron group metal nitrate. The present process contemplates a common impregnating solution, co-solubility of said Group VI–B metal compound and said iron group metal nitrate being suitably accomplished in an aqueous ammoniacal solution comprising about 5 weight percent or more, and preferably about 10 weight percent or more, ammonia. As generally practiced, in the manufacture of catalyst comprising in excess of about 3.5 weight percent iron group metal in combination with in excess of about 7.0 weight percent Group VI–B metal utilizing a common ammoniacal impregnating solution, excessive breakage of the shaped catalyst particles occurs. It is considered that this results from the combination and quantity of excess ammonia and nitrate which, upon oxidation, is sufficient to shatter the catalyst particles. It is understood that this theory is presented solely as a probable explanation of a poor catalyst yield obtained by the conventional impregnating technique, a problem which is substantially obviated by the present process.

Of the Group VI–B metal, i.e., chromium, tungsten and molybdenum, molybdenum is a preferred catalyst component, suitable molybdenum compounds including molybdic acid, ammonium paramolybdate, and the like. The iron group metal nitrates, i.e., the nitrates of iron, nickel, and cobalt, may be employed alone or in combination, nickel and cobalt, alone or in combination, being preferred catalyst components together with molybdenum. It is the essence of this invention that the metals concentration of said ammoniacal impregnating solution be controlled so as to deposit less than about 3.5 weight percent iron group metal on the carrier material and less than about 7.0 weight percent Group VI–B metal in any single impregnation. When the catalyst is prepared to contain two or more iron group metals, the total concentration thereof will be within the stated limitation. Prior to each subsequent impregnation, the previously impregnated carrier material is dried and calcined at oxidation conditions.

In a preferred method, the carrier material, or previously impregnated and calcined carrier material, is soaked in the ammoniacal impregnating solution at about room temperature for a time sufficient to permit substantial penetration of the shaped carrier particles by the impregnating solution, usually a period of from about 0.75 hour to about 2 hours. Thereafter, the impregnating solution is evaporated to dryness in a rotary drier. Calcination at oxidation conditions comprises heating of the dried impregnated carrier material at a temperature of from about 500° F. to about 1700° F., preferably at a temperature of from about 500° F. to about 1200° F., in an oxygen-containing atmosphere, usually air, whereby the catalytic components, for example nickel and molybdenum, are converted to the oxides thereof. The time required for calcination will depend on the temperature employed. In general, calcination is suitably accomplished in from about 0.75 hour to about 5 hours.

After preparation in the manner hereinbefore set forth, the catalyst may be treated in a reducing atmosphere, such as hydrogen, at conditions to convert the iron group metal component to its elemental state, the catalyst being thereafter subjected to sulfidation by passing hydrogen sulfide or other suitable sulfur-containing compound therethrough, preferably at an elevated temperature which may range from about 500° to about 1000° F. or more for a time sufficient to effect complete sulfidation, which may be determined by continuing reaction until there is no further absorption of hydrogen sulfide or other sulfur-containing compound. When the catalyst is utilized for threatment or conversion of hydrocarbons or other organic fractions containing sulfur compounds, sulfidation may be effected in situ during use of the catalyst in the purification or conversion process.

The catalysts of the present invention are particularly suitable for the treatment of organic compounds and especially of hydrocarbons. Still more particularly, these catalysts are of advantage for use in the treatment of gasoline or gasoline fractions containing undesirable impurities. The treatment of gasoline or gasoline fractions generally is effected in the presence of hydrogen at temperatures of from 500° F. to about 800° F., although in some cases higher temperatures up to 850° F. to about 900° F. may be employed. Atmospheric and preferably superatmospheric pressures ranging from 50 to 5000 pounds per square inch or more may be utilized. This treatment will serve to remove impurities comprising sulfur, nitrogen, and olefinic compounds from the gasoline or gasoline fractions, and thereby is particularly suitable for the treatment of gasoline or gasoline fractions prior to reforming of the gasoline in contact with a reforming catalyst containing a noble metal or expensive metal, and particularly platinum, in order to avoid the deleterious effects of these impurities on the reforming catalyst. Similarly, the catalyst of the present invention may be used for the treatment of other hydrocarbon fractions in order to remove undesirable impurities as, for example, the treatment of aromatic solvents, kerosene, stove oil, diesel fuel, gas oil, fuel oil, etc.

The catalyst of the present invention also may find utility for other conversion reactions of organic compounds and particularly hydrocarbons, including reforming of gasoline, dehydrogenation of normally gaseous or normally liquid hydrocarbons, isomerization of hydrocarbons, destructive hydrogenation of hydrocarbons to lower molecular weight compounds, hydrogen transfer reactions, alkyl transfer reactions, polymerization reactions, etc. Dehydrogenation and reforming reactions generally are effected at temperatures of from about 800 F. to about 1200 F. or more, while non-destructive hydrogenation reactions generally are effected at temperatures of from about 300° F. to about 800° F. The various reactions hereinbefore set forth may be effected in the presence of hydrogen when required or of advantage.

The following examples are presented in illustration of the process of this invention and are not intended as an undue limitation on the generally broad scope of the invention as set out in the appended claims.

EXAMPLE I

A catalyst was prepared to contain 5 weight percent nickel and 10 weight percent molybdenum on an alumina support. An ammoniacal impregnating solution was prepared by dissolving 118.5 grams of 85% molybdic acid ($MoO_3$) and 350 milliliters of a 28% ammonia solution admixed with 550 milliliters of water. Nickel nitrate hexahydrate (157 grams) was added to the ammoniacal solution which was then adjusted to a final volume of 1160 milliliters with a 10% ammonia solution. Spherical alumina particles (500 grams), of approximately 1/16" diameter, were soaked in the impregnating solution at room temperature for about 1 hour and the mixture was thereafter evaporated to dryness in a rotary steam drier. The dried catalyst was thereafter calcined in a rotary stainless steel kiln, air being passed over the catalyst at a rate of about 1 cubic foot per minute. The catalyst was calcined at 500° F. for 1 hour and then at 1100° F. for about 3 hours. Spherical catalyst particles were recovered in about 21.2% yield and analyzed 4.71 weight percent nickel and 9.25 weight percent molybdenum.

EXAMPLE II

The catalyst of this example was prepared in accordance with the process of this invention to contain 5 weight percent nickel and 10 weight percent molybdenum on an alumina support. An ammoniacal impregnating solution was prepared dissolving 59.25 grams of 85% molybdic acid ($MoO_2$) and 350 milliliters of a 28% ammonia solution admixed with 550 milliliters of water. Nickel nitrate hexahydrate (78.5 grams) was added to the ammoniacal solution which was then adjusted to a final volume of 1160 milliliters with a 10% ammonia solution. Spherical alumina particles (500 grams), of approxiamtely 1/16" diameter, were soaked in the impregnating solution at room temperature for about 1 hour and the mixture was thereafter evaporated to dryness in a rotary steam drier. The dried catalyst was thereafter calcined in a rotary stainless steel kiln, air being passed in contact with the catalyst at a rate of about 1 cubic foot per minute. The catalyst was calcined at 500° F. for 1 hour and then at 1100° F. for 2 hours. The calcined catalyst was thereafter treated with a second impregnating solution substantially identical to the first mentioned impregnating solution. The thus impregnated calcined catalyst was thereafter dried and calcined in the described manner and at the described conditions to yield a final catalyst product. Spherical catalyst product was recovered in excess of 95% yield and analyzed 5.08 weight percent nickel and 9.91 weight percent molybdenum.

We claim as our invention:

1. In a process for preparing a catalyst comprising about 3.5 wt. percent iron group metal and in excess of about 7.0 wt. percent Group VI-B metal on a refractory inorganic oxide carrier material, the method of obtaining improved product yields in the desired size and shape range which comprises:
   (a) forming refractory inorganic oxide particles having a predetermined size and shape conforming to the size and shape of the desired catalyst product;
   (b) compositing a Group VI-B metal and an iron group metal with said particles by treating the same with an ammoniacal impregnating solution containing both a Group VI-B metal compound and an iron group metal nitrate and calcining the resultant composite at oxidation conditions, the metals concentration of said ammoniacal solution being sufficiently limited so as to deposit less than about 3.5 wt. percent iron group metal in said carrier material, and less than about 7.0 wt. percent Group VI-B metal; and
   (c) further treating the calcined composite at least once in accordance with the procedure of step (b) including calcination at oxidation conditions to form a composite of substantially the same size and shape as the refractory inorganic oxide particles of step (a) and comprising in excess of about 3.5 wt. percent iron group metal and in excess of about 7.0 wt. percent Group VI-B metal.

2. The method of claim 1 further characterized in that said Group VI-B metal is molybdenum.

3. The method of claim 2 further characterized in that said iron group metal is nickel.

4. The method of claim 2 further characterized in that said iron group metal is cobalt.

5. The method of claim 3 further characterized in that said carrier material is alumina.

6. The mtehod of claim 4 further characterized in that said carrier material is alumina.

7. The method of claim 5 further characterized in that said calcination comprises heating at a temperature of from about 500° F. to about 1200° F. in an air atmosphere.

8. The method of claim 6 further characterized in that said calcination comprises heating at a temperature of from about 500° F. to about 1200° F. in an air atmosphere.

9. The method of claim 7 further characterized in that said molybdenum compound is ammonium molybdate.

10. The method of claim 1 further characterized in that said particles are spherical and have a diameter of approximately 1/16 inch.

References Cited

UNITED STATES PATENTS

| | | | |
|---|---|---|---|
| 3,269,936 | 8/1966 | Goldthwait et al. | 208—111 |
| 3,375,065 | 3/1968 | McDaniels et al. | 252—455 X |
| 3,409,562 | 11/1968 | Bridge | 252—458 X |
| 3,242,101 | 3/1966 | Erickson et al. | 252—466 |

DANIEL E. WYMAN, Primary Examiner

C. F. DEES, Assistant Examiner

U.S. Cl. X.R.

252—458, 470